US012222698B2

(12) United States Patent
Gnad

(10) Patent No.: US 12,222,698 B2
(45) Date of Patent: Feb. 11, 2025

(54) METHOD FOR DETECTING THE MAKING OR BREAKING OF CONTACT OF A SONOTRODE WITH A COUNTER-ELEMENT

(71) Applicant: Herrmann Ultraschalltechnik Gmbh & Co. KG, Karlsbad (DE)

(72) Inventor: Gerhard Gnad, Keltern (DE)

(73) Assignee: HERRMANN ULTRASCHALLTECHNIK GMBH & CO. KG, Karlsbad (DE)

( * ) Notice: Subject to any disclaimer, the term of this patent is extended or adjusted under 35 U.S.C. 154(b) by 564 days.

(21) Appl. No.: 17/417,913

(22) PCT Filed: Mar. 10, 2020

(86) PCT No.: PCT/EP2020/056298
§ 371 (c)(1),
(2) Date: Jun. 24, 2021

(87) PCT Pub. No.: WO2020/187639
PCT Pub. Date: Sep. 24, 2020

(65) Prior Publication Data
US 2022/0075341 A1 Mar. 10, 2022

(30) Foreign Application Priority Data
Mar. 15, 2019 (DE) .................... 10 2019 106 694.8

(51) Int. Cl.
G05B 19/18 (2006.01)
B23K 20/10 (2006.01)
B26D 5/00 (2006.01)
B26D 7/08 (2006.01)
G01H 1/00 (2006.01)

(52) U.S. Cl.
CPC ............ G05B 19/182 (2013.01); B23K 20/10 (2013.01); G01H 1/00 (2013.01); B26D 5/00 (2013.01);
(Continued)

(58) Field of Classification Search
CPC . B29C 65/08; B29C 66/9515; B29C 66/9516; B23K 20/10; B23K 31/125; G01H 1/08; G01H 1/16
See application file for complete search history.

(56) References Cited

U.S. PATENT DOCUMENTS 3,153,850 A    10/1964  Worlton et al.
5,658,408 A *   8/1997  Frantz .................... B29C 66/41
                                                        156/359
(Continued)

FOREIGN PATENT DOCUMENTS

CN    10359 7327 A    2/2014
DE       2823361 A1  12/1979
(Continued)

OTHER PUBLICATIONS

Office Action, dated Jul. 1, 2022, Chinese Patent Application No. 2020/80020740.5 (and English Translation of Office Action).
(Continued)

Primary Examiner — Carson Gross
(74) Attorney, Agent, or Firm — PAUL & PAUL

(57) ABSTRACT

The present invention concerns a method of detecting the making or breaking of contact of a sonotrode (4) which is caused to vibrate with a frequency f and a vibration amplitude $A_0$ with a counterpart element (5). To provide a method with which contact-making or breaking of a sonotrode with a counterpart element can be particularly quickly and inexpensively detected it is proposed according to the invention that the method has the following steps: a) recording a time configuration of the vibration amplitude $A_0$ (1) during a first measurement time interval $\Delta T$, and b) determining from the time configuration of the vibration amplitude $A_0$ (1) whether making or breaking of contact occurred within the measurement time interval $\Delta T$.

13 Claims, 2 Drawing Sheets

Figure 1:
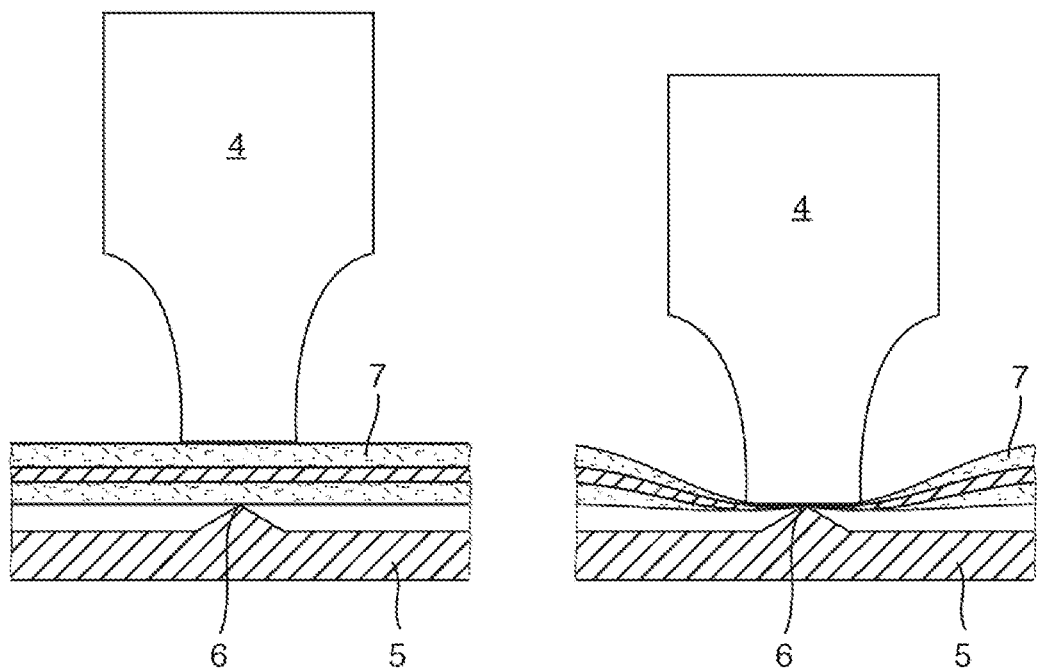

(52) U.S. Cl.
CPC .... *B26D 7/086* (2013.01); *G05B 2219/45146* (2013.01)

(56) References Cited

U.S. PATENT DOCUMENTS

| | | | |
|---|---|---|---|
| 6,628,408 B1* | 9/2003 | Franklin | B29C 66/9192 |
| | | | 356/615 |
| 7,647,828 B2 | 1/2010 | Gassert | |
| 8,021,504 B2 | 9/2011 | Gabler et al. | |
| 9,423,291 B2* | 8/2016 | Jurzitza | B06B 1/0261 |
| 2006/0149485 A1* | 7/2006 | Oblak | B23K 20/10 |
| | | | 702/56 |
| 2009/0013786 A1 | 1/2009 | Gassert | |
| 2012/0311975 A1* | 12/2012 | Kamigaito | B29C 66/81431 |
| | | | 53/548 |

FOREIGN PATENT DOCUMENTS

| | | |
|---|---|---|
| DE | 3429776 A1 | 2/1986 |
| DE | 102004026826 A1 | 1/2006 |
| DE | 102006020429 A1 | 10/2007 |
| EP | 0567426 A2 | 10/1993 |
| EP | 2532594 A1 | 12/2012 |
| FR | 2427652 A1 | 12/1979 |
| JP | 1994007745 A | 1/1994 |
| JP | 2008500904 A | 1/2008 |
| JP | 2012024771 A | 2/2012 |
| KR | 1020090057116 | 6/2009 |
| WO | 2005116593 A1 | 12/2005 |
| WO | 2013017452 A1 | 2/2013 |

OTHER PUBLICATIONS

Nora Lindner, The International Bureau of the World Intellectual Property Organization, International Preliminary Report on Patentability Dated Sep. 16, 2021, PCT/EP2020/056298 (English translation).

Korean Patent Application No. 10-2021-7032140, Office Action, Dated Jun. 18, 2024 (and English Translation).

Japanese Application No. 2021-553289, Office Action, Mailing Date: Dec. 5, 2023.

* cited by examiner

METHOD FOR DETECTING THE MAKING OR BREAKING OF CONTACT OF A SONOTRODE WITH A COUNTER-ELEMENT

CROSS-REFERENCE TO RELATED APPLICATIONS

This application is a national phase of International Application PCT/EP2020/056298 filed Mar. 10, 2020, and claims the priority of German Application No. 10 2019 106 694.8, filed on Mar. 15, 2019.

The present invention concerns a method of detecting the making or breaking of contact of a sonotrode which is caused to vibrate with a frequency f and a vibration amplitude $A_0$ with a counterpart element. In particular the present invention concerns a method of detecting contact-making of a sonotrode with a counterpart tool, wherein a material to be processed can be arranged between the sonotrode and the counterpart tool. The present invention further concerns a method of controlling an ultrasonic vibration apparatus.

Ultrasonic vibration apparatuses generally have at least one sonotrode which in its intended use can be caused to perform a mechanical vibration. In the case of ultrasonic welding with an ultrasonic welding apparatus or ultrasonic cutting with an ultrasonic cutting apparatus a counterpart tool is arranged opposite to the sonotrode and the material to be processed is arranged between the sonotrode and the counterpart tool. The material is then provided with a weld seam or is cut by the sonotrode depending on the respective area of application.

When in ultrasonic cutting a cut has been successfully concluded or in ultrasonic welding the end of a strip of material is reached contact occurs between the sonotrode and the counterpart tool.

Such contact or collision between sonotrode and counterpart tool which occurs during an operationally conditioned vibration of the sonotrode is on the one hand an unwanted effect as both the sonotrode and also the counterpart tool comprise hard materials so that collision of the counterpart tool and the sonotrode or when they rub against each other gives rise to severe wear for those two components.

On the other hand contact-making between sonotrode and counterpart tool indicates certain process events. In a cutting operation with an ultrasonic cutting apparatus contact-making between sonotrode and counterpart tool indicates that the material to be cut has been severed. When welding with an ultrasonic welding apparatus contact-making between sonotrode and counterpart tool can correspondingly indicate unintended severing of the material. In both applications the fact that the sonotrode and the counterpart tool come into contact with each other can also indicate that the end of a strip of material which is being guided along between the sonotrode and the counterpart tool has been reached.

Particularly when cutting with an ultrasonic cutting apparatus it is important for process security and the quality of the products to be worked to be able to establish the moment in time at which the sonotrode and the corresponding counterpart tool come into contact, as that makes it possible to carry out subsequent adequate measures. In that respect a difference is to be made between the time at which contact actually occurs and the time at which the contact is ascertained and located. The interposed time is referred to in accordance with the present invention as the recording time. Reaction to the contact can therefore take place only after the expiry of the recording time so that the reaction time is greater than or equal to the recording time.

Hitherto ultrasonic cutting operations were generally simply carried out until a given predefined operating time or a given predefined energy consumption was reached, for which it was indicated for the respective application from preceding experience that the cutting operation is concluded after the expiry of that operating time or after that level of energy consumption is reached. Those methods however are not particularly precise and require a long lead time, in which firstly sufficient experience or measurements have to be collected for a given application.

Alternatively a so-called metal contact electronic effect was used, in which contact-making of sonotrode and counterpart electrode was established similarly as in the case of a relay switch by way of a dc voltage additionally applied from the exterior. Such a method however requires additional sensor means and electronic means and therefore involves a greater degree of complication and higher costs. The recording times of such methods are 2 ms or more. That is too long for many applications.

Besides determining the making of contact of a sonotrode with a counterpart tool it is also desirable to be able to determine when a sonotrode and a counterpart tool are out of contact with each other and when a sonotrode comes out of contact with another counterpart element. The detection of such events with additional sensor means however often takes too long or is too complicated.

With that background in mind the object of the present invention is to provide a method with which contact-making or contact-breaking of a sonotrode with a counterpart element can be detected, wherein the method eliminates or at least alleviates the stated problems. In particular an object of the present invention is to provide a method which determines the moment of a sonotrode making contact with a counterpart tool with a recording time of less than 1 ms and which is also inexpensive.

The object of the invention is attained by a method according to claim 1. The subject-matter of claim 1 is a method of detecting the making or breaking of contact of a sonotrode which is caused to vibrate with a frequency f and a vibration amplitude $A_0$ with a counterpart element, comprising the steps:

a) recording a time configuration of the vibration amplitude $A_0$ during a first measurement time interval $\Delta T$, and b) determining from the time configuration of the vibration amplitude $A_0$ whether making or breaking of contact occurred within the measurement time interval $\Delta T$.

In comparison with the previously known methods which were directed exclusively to the detection of contact-making, the method according to the invention also makes it possible to detect breaking of contact. That can be of significance for example in the ultrasonic working of multilayer systems when severing of an inwardly disposed harder layer (being therefore breaking of contact with that harder layer) is to be recorded.

Preferably the vibration is a periodic vibration and in particular a harmonic vibration. On the assumption of a harmonic vibration of the frequency f the deflection A(t) of the vibration is related as a function of time t in the usual fashion:

$$A(t)=A_0(t)\cos(2\pi ft)$$

with the vibration amplitude $A_0$. In the ideal state the sonotrode vibrates with a constant vibration amplitude $A_0$. The vibration amplitude however changes if the coupling between the sonotrode and the counterpart tool or between the sonotrode and material to be worked changes so that then the vibration amplitude is also a time-dependent parameter $A_0(t)$. The present invention makes use of that.

With the method according to the invention the time of contact-making or breaking is determined markedly faster than is the case with the methods known from the state of the art. As a result the method according to the invention allows shorter recording times of 100 μs and less. The result of this is that it is possible to react even faster to contact-making or breaking of counterpart element and sonotrode, in particular counterpart tool and sonotrode. Consequently the method according to the invention affords the possibility of reacting with very short reaction times to contact-making and breaking of sonotrode and counterpart element.

The term reaction time is used to denote the time between the actual moment in time of contact-making or breaking occurring and the moment in time of a reaction thereto, like for example the implementation of a control command.

In a preferred embodiment in step b) of the method according to the invention making or breaking of contact of the sonotrode with the counterpart element is established if the recorded vibration amplitude $A_0$ differs from a predetermined reference amplitude R by more than a predetermined tolerance value α or if the recorded vibration amplitude $A_0$ lies outside a predetermined tolerance range $[T_{min}, T_{max}]$.

This embodiment consequently provides a tolerance range which is defined either by a reference amplitude R and a tolerance value α or a tolerance range $[T_{min}, T_{max}]$. That tolerance range involves a continuous sub-range of the possible vibration amplitude. It has been found that such a tolerance range can be defined for any vibrating sonotrode of an ultrasonic vibration apparatus so that, upon contact-making or breaking of sonotrode and counterpart element and in particular upon contact-making between sonotrode and counterpart tool the vibration amplitude lies outside a definable tolerance range and otherwise in the case of a regular vibration without contact-making or breaking of sonotrode and counterpart element lies within that tolerance range.

Preferably contact-making or breaking is established only when the vibration amplitude leaves the tolerance range.

That has the advantage that the transient condition of the ultrasonic vibration apparatus does not have to be treated separately. During the transient condition of a sonotrode the vibration amplitude can assume values outside a predefined tolerance range although no corresponding contact-making or breaking of sonotrode and counterpart element occurs. Determining contact-making or breaking of contact in accordance with the preferred embodiment being discussed here however presupposes that the vibration amplitude leaves the tolerance range. In general however the vibration amplitude first assumes values within the tolerance range, only upon the conclusion of the transient condition. Therefore the requirement for "leaving" ensures that false determination of contact-making or breaking does not occur during the transient condition.

To form a redundant system which minimises the risk of a false positive determination of contact-making or breaking the measurement time interval $\Delta T$ is also preferably such that a transient condition of the sonotrode is concluded before the beginning of the measurement time interval $\Delta T$.

Using a tolerance range for determining contact-making or breaking of sonotrode and counterpart element is particularly advantageous as in that way contact-making or breaking can be very easily and quickly determined and no time-consuming calculations based on the time configuration of the vibration amplitude have to be performed, which would increase the recording time and the potential reaction time. Rather contact-making or breaking is established directly by the vibration amplitude being outside the tolerance range or leaving the tolerance range.

In a particularly simple embodiment the reference amplitude can simply be the preceding detected measurement value. As soon as the difference between the current measurement value and the previous measurement value (as the reference amplitude) becomes greater than a predetermined tolerance value α that is interpreted as contact-making (or as contact-breaking). The tolerance value α can be based on empirical values.

To be able to ignore short-term changes in the vibration amplitude it may be advantageous if the measurement signal of the vibration amplitude is passed by way of a low pass filter.

In a particularly preferred embodiment before step a) during a second measurement time interval $\Delta t$ a time configuration of the vibration amplitude $A_0$ is recorded and the reference amplitude and/or the tolerance range are calculated from the recording during the second measurement time interval $\Delta t$.

In this embodiment the tolerance range is advantageously established in operation without precedingly establishing or adjusting the ultrasonic vibration apparatus. Consequently automated self-calibration of the ultrasonic vibration apparatus takes place, which is always adapted to the ongoing operation or to the vibration in ongoing operation, so that the respectively appropriate reference amplitude does not have to be set from the exterior for different ultrasonic vibration apparatuses or different applications or different external circumstances. That simplifies handling and improves the efficiency of the ultrasonic vibration apparatus in question.

In particular in regard to the detection of contact-making between a sonotrode and a counterpart tool there are known time intervals in respect of many ultrasonic applications like for example in ultrasonic welding or ultrasonic cutting, within which under normal circumstances contact-making between sonotrode and counterpart tool is to be expected. The embodiment discussed here makes it possible to use one or more of those time intervals as the second measurement time interval to define the reference amplitude for the tolerance range.

In the case of corresponding methods of detecting contact-making of a sonotrode with a counterpart tool therefore the second measurement time interval is preferably so selected that no contact-making between sonotrode and counterpart tool is to be expected under usual circumstances within the second measurement time interval.

A further embodiment provides that a mean vibration amplitude is calculated from the recording during the second measurement time interval $\Delta t$ and the calculated mean vibration amplitude is used in step b) as the predetermined reference amplitude. The use of a mean value of the vibration amplitude which is calculated during operation as a reference amplitude ensures that the tolerance range ensuing from the reference amplitude and the tolerance value is always accurately adapted to ongoing operation.

In a further embodiment a minimum vibration amplitude $A_{min}$ and a maximum vibration amplitude $A_{max}$ is determined from the recording during the second measurement time interval $\Delta t$ and the tolerance interval is calculated from the minimum vibration amplitude $A_{min}$ and the maximum vibration amplitude $A_{max}$ with $T_{min} \leq A_{min}$ and $T_{max} \geq A_{max}$. This embodiment ensures in particular that the tolerance range formed by the tolerance interval includes all values of the vibration amplitude which do not indicate contact-making or breaking of the sonotrode with a counterpart element. In that respect the tolerance interval is always adapted to the particular circumstances involved in operation. Thus the tolerance interval of a single ultrasonic cutting apparatus can be dynamically adapted on the basis of different external circumstances. For example the tolerance interval can be broader in a first cutting process than in a subsequent second cutting process.

For a process which is repeated again and again and which is performed by an ultrasonic vibration apparatus the above-mentioned embodiments for automatedly determining the reference amplitude and/or the tolerance interval are preferably carried out once or only a few times. Then the reference amplitudes and/or tolerance intervals determined in that way are used for further similar processes for which no changes in the external circumstances are to be expected.

The term processes of an ultrasonic vibration apparatus is used to denote in particular cutting processes of an ultrasonic cutting tool and welding processes of a ultrasonic welding tool.

A preferred embodiment provides that in step a) the sonotrode is excited by a converter, wherein the convertor is connected to a current generator and the current $I_E(t)$ which is provided by the current generator and flows through the converter is measured, in which case the voltage $U_E(t)$ applied to the converter by the current generator is measured, and wherein the vibration amplitude or a field size related to the vibration amplitude of the electrical vibration system comprising the current generator and the converter is calculated from the measured voltage $U_E(t)$ and from the measured current $I_E(t)$.

In particular the vibration amplitude can be determined with a method known from WO 2013/017452 A2.

The current producing unit is preferably a generator and provides a voltage which changes periodically, preferably an ac voltage, which is preferably converted in a converter with a piezo-electric element into a mechanical vibration so that a standing wave is produced within a freely vibrating ultrasonic vibration apparatus, wherein the sonotrode and the applied voltage are such that the position of a wave crest of the standing wave coincides with the position of a front face of the sonotrode. The frequency of the applied periodically varying voltage is the exciter frequency which is so selected that it corresponds to a resonance frequency of the ultrasonic vibration apparatus which is vibrating freely, that is to say not in contact with other elements.

Having regard to the embodiment discussed here the present invention is based inter alia on the realisation that with contact-making or breaking of sonotrode and counterpart element the vibrating configuration of the entire ultrasonic vibration apparatus is modified in such a way that the resonance frequency of the ultrasonic vibration apparatus shifts. As a consequence exciter frequency and resonance frequency no longer coincide. That in turn causes a change like for example a "jitter", that is to say an alternating increase and decrease in the vibration amplitude.

In a further embodiment the method according to the invention has the following further step c):

c) determining a time $t_0$ at which contact-making or breaking recorded in step b) occurs from the time configuration of the vibration amplitude (1), wherein the time at which the vibration amplitude within the measurement time interval $\Delta T$ for the first time leaves the tolerance range or a time shifted from said time by a predefined correction time is established as the time $t_0$ of contact-making or breaking.

By determining the moment in time it is advantageously possible to implement further optimisation of the underlying process.

The first alternative in which the moment in time at which the vibration amplitude for the first time within the measurement time interval leaves the tolerance range is established as the time $t_0$ of contact-making or breaking represents a particularly simple method of determining the time of contact-making or breaking, which exclusively requires a simple query of the vibration amplitude and a comparison with the tolerance range. In addition no further method steps are necessary so that, by means of this preferred method, particularly rapid and efficient determination of the time $t_0$ of contact-making or breaking is effected.

With the second alternative which provides a correction time the time of contact-making or breaking can be very accurately and specifically established in dependence on events, experience and measurements which are made with individual ultrasonic vibration apparatuses.

In an embodiment in step a) a sampling rate for determining the time configuration of the vibration amplitude of at least 2000 samples/second, preferably at least 5000 samples/second and particularly preferably at least 15000 samples/second is used. In a preferred embodiment thus a measurement value was recorded every 50 μs, which corresponds to 20000 samples/second.

The above-specified sampling rates ensure that the time between the moment in time at which the vibration amplitude actually leaves the tolerance range and the moment in time at which the tolerance range is established as being left is sufficiently short. For example with a sampling rate of 5000 samples/second between the time at which the vibration amplitude actually leaves the tolerance range and the given time at which it is recognised that the amplitude has left the tolerance range is always less than 200 μs, with a sampling rate of 10000 samples/second it is always less than 100 μs and with a sampling rate of 20000 samples/second it is always less than 50 μs.

In a particularly preferred embodiment a counterpart tool is used as the counterpart element, wherein a material to be processed can be arranged between the sonotrode and the counterpart tool and wherein contact-making of the sonotrode with the counterpart tool is detected.

In that way for example in ultrasonic welding it is advantageously possible to detect when a cut is concluded as the fact of contact occurring between sonotrode and counterpart tool indicates success has occurred with a cutting process.

The object of the invention is further attained by a method of controlling an ultrasonic vibration apparatus, wherein the ultrasonic vibration apparatus has a sonotrode and a counterpart tool and wherein the counterpart tool is arranged in operation in opposite relationship with the sonotrode in such a way that a material for processing by the sonotrode can be arranged between the sonotrode and the counterpart tool, comprising the steps:

A) exciting the sonotrode with a vibration during a predetermined time duration $t_d$, then B) carrying out the method according to claim 8 (according to the above-discussed embodiment), and C) terminating the excitation of the sonotrode or moving the sonotrode away from the counterpart tool if in step B) contact-making between the sonotrode and the counterpart tool was detected.

Contact-making between sonotrode and counterpart tool determined by means of the above-discussed method is used by the method described in this embodiment for controlling the ultrasonic vibration apparatus. In that case the method steps are preferably effected in an automated procedure.

As the recording times of the above-discussed method according to the invention for determining contact-making between sonotrode and counterpart tool are markedly shorter than the recording times known from the state of the art the potential reaction time of the control command which follows the fact of contact-making being determined is also markedly shorter.

As the contact-making of sonotrode and counterpart tool under a vibrating sonotrode by virtue of the components hitting against each other or rubbing against each other which takes place in that situation involves an increased amount of wear the termination (shut-down) of excitation or the fact of the sonotrode moving away after the first detected contact occurring between the sonotrode and the counterpart tool means that the wear of sonotrode and counterpart tool is limited to a minimum, in which case the reaction time which can be used in that case is markedly shorter—more specifically in the region of about 100 μs—than with the methods used previously and which are based on metal contact detection. Those methods involve minimum achievable reaction times of 2 ms based on the recording times which can be achieved in that situation.

In a preferred embodiment of this method step C) is carried out only after the expiry of a predefined follow-on time $t_N$ after detection of contact-making, wherein preferably immediately after detection of contact-making a reduction in the vibration amplitude is implemented.

Such a predefined follow-on time $t_N$ is particularly advantageous when, with contact occurring between counterpart tool and sonotrode, the process of applying ultrasound, for example an ultrasonic welding operation or an ultrasonic cutting operation, is not completely concluded. Thus the sonotrode and the counterpart tool can portion-wise come into contact in a cutting operation although the material to be cut is not yet 100% severed. It is therefore advantageous for ultrasonic vibration apparatuses that there is provided such a predefined follow-on time and same is adjustable.

In addition it can also happen that contact-making is determined shortly before actual contact takes place. In such a case the recording time would consequently be negative. For those situations a follow-on time is therefore also meaningful in order to ensure that the desired use, for example an ultrasonic cutting operation, is successfully concluded.

Preferably the vibration amplitude is steadily reduced within the follow-up time so that this does not involve an abrupt conclusion for the vibration but "fading out" of the vibration. In that way in the ultrasonic cutting operation the cut edges and in the ultrasonic welding operation the weld seams are particularly clean.

In a particularly preferred embodiment the beginning of the measurement time interval ΔT considered from the time of the beginning (switch-on) of the vibration of the sonotrode occurs only after the expiry of a delay time $t_d$ so that a transient condition of the vibration of the sonotrode occurs outside the measurement time interval ΔT.

In that way the above-mentioned transient condition of the sonotrode, between which the vibration generally also occurs outside a possibly defined tolerance range is excluded from the measurement time interval so that there cannot be a false positive determination of contact on the basis of the time configuration of the amplitude of the vibration of the sonotrode. Establishing the measurement time interval in that way is not critical in the vast majority of cases in regard to the risk of not determining contact-making which occurs outside the measurement time interval as during the transient condition contact-making between sonotrode and counterpart tool is generally not to be expected in the case of ultrasonic vibration apparatuses or ultrasonic vibration applications.

All embodiments of the methods according to the invention are preferably in the form of computer-implemented methods.

In addition the present invention also includes an ultrasonic vibration apparatus comprising a sonotrode, a counterpart tool, wherein a material to be processed by the sonotrode can be arranged between the sonotrode and the counterpart tool and including means for carrying out a computer-implemented method according to one of the above-described embodiments. Preferably in that respect the ultrasonic vibration apparatus has a generator for providing a high-frequency electrical voltage, a converter having at least one piezo-electric element for converting the high-frequency electrical voltage into a mechanical vibration, wherein the converter is so connected to the sonotrode that a mechanical vibration of the converter is transmitted to the sonotrode.

Preferably the ultrasonic vibration apparatus according to the invention is an ultrasonic cutting apparatus. In regard to such ultrasonic cutting apparatuses it is particularly advantageous if the reaction time for controlling the ultrasonic vibration apparatus subsequently to given contact occurring between sonotrode and counterpart tool is particularly short as contact occurring between sonotrode and counterpart tool is equivalent to a termination of the cutting operation. In that way cutting processes can be carried out more efficiently and gently in respect of the tool used.

Furthermore the present invention includes a computer program including commands which in execution of the program by a computer or processor cause it to carry out a method according to one of the above-described embodiments.

The invention also includes a computer-readable storage medium including commands which in execution by a computer cause it to carry out a method according to one of the above-described embodiments.

Figure 2:
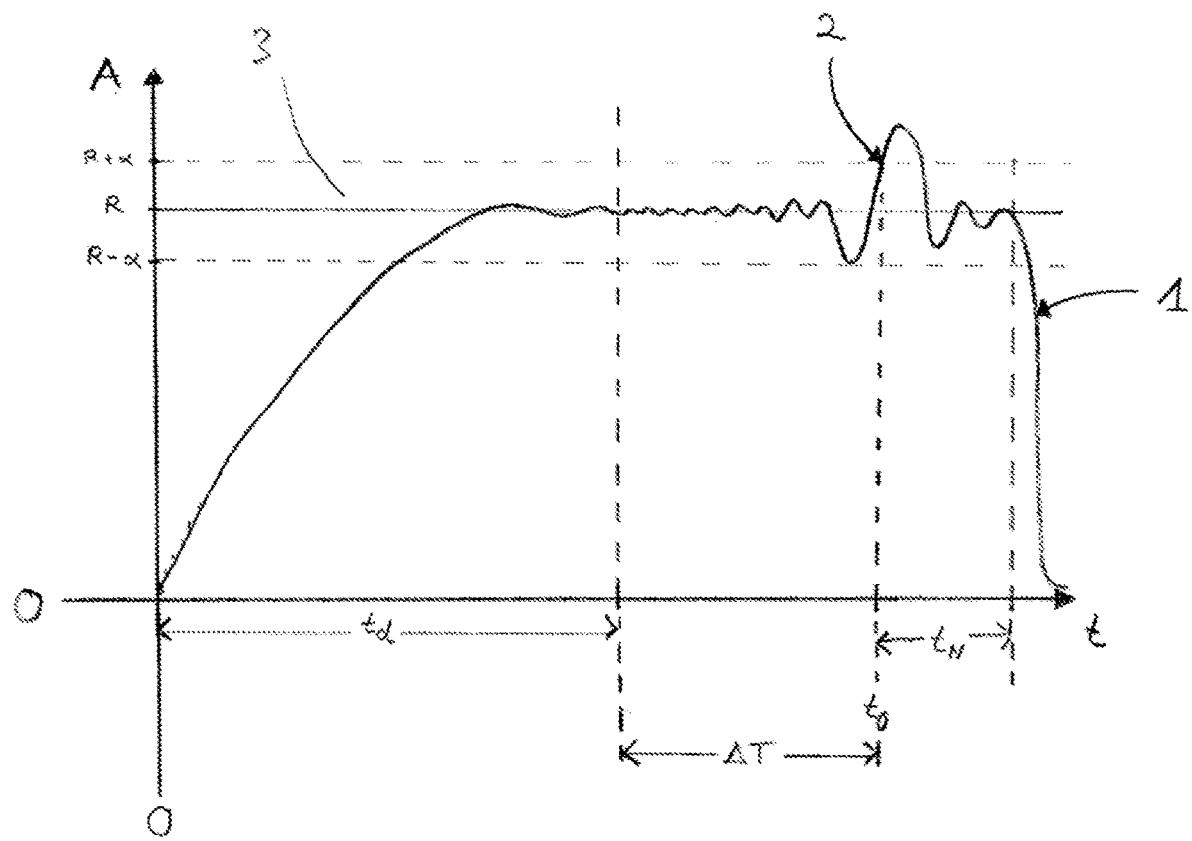

Further advantages, features and possible applications of the present invention will be apparent from the description hereinafter of a preferred embodiment and the accompanying Figures in which:

FIG. 1 shows a diagrammatic view of a sonotrode and an anvil before contact-making (at the left) and upon contact-making, and FIG. 2 shows a graph illustrating the time configuration of the vibration amplitude of a sonotrode when using an embodiment of the method according to the invention.

FIG. 1 shows a diagrammatic view of a sonotrode 4 and a counterpart tool 5. A material 7 to be severed is disposed between the sonotrode 4 and the counterpart tool 5. The counterpart tool 5 has a raised portion 6.

The situation immediately before processing is shown on the left-hand side of FIG. 1. To sever the material 7 the sonotrode 4 is moved in the direction of the counterpart tool 5. The material is compressed between the sonotrode 4 and the raised portion 6 until the sonotrode 4 and the raised portion 6 come into contact with each other, as shown at the right in FIG. 1. When the raised portion 6 comes into contact with the sonotrode 4 the material 7 is severed and the processing step is concluded. In the state shown at the right in FIG. 1 the making of contact between the raised portion 6 and the sonotrode 4 leads to a change in the vibration amplitude of the sonotrode 4, that is detected according to the invention.

FIG. 2 shows a two-axis graph in which time t is plotted on the horizontal axis and the vibration amplitude $A_0$ is plotted on the vertical axis. The line identified by reference 1 consequently represents the time configuration 1 of the vibration amplitude $A_0$.

The illustrated time configuration 1 of the vibration amplitude $A_0$ involves the time configuration of the vibration amplitude of a sonotrode of an ultrasonic cutting apparatus, in which a method according to the invention for detection of contact-making between a sonotrode and a counterpart tool was used. In the basic cutting process a material was arranged between the sonotrode and the counterpart tool, and that material was then cut by the sonotrode by ultrasonic machining. The time configuration 1 shown in FIG. 2 illustrates the vibration amplitude $A_0$ of the sonotrode from the moment in time at the beginning or initiation of the vibration used in that case of the sonotrode to the moment in time at which the vibration of the sonotrode ends.

The transient condition can be seen in the time configuration 1 of the vibration amplitude $A_0$ in the left-hand region thereof, in which the vibration amplitude $A_0$ of the sonotrode firstly rises steadily from a zero position before then in the central region of the graph it adopts a configuration in which it vibrates slightly about a fixed value, which shows that the transient condition is terminated.

In the time configuration of the vibration amplitude $A_0$, shown in FIG. 2, an embodiment of the method according to the invention was used, which involves a delay time $t_d$ such that the measurement time interval $\Delta T$ only starts after the conclusion of the transient state. The time extent of the delay time $t_d$ is identified by a double-headed arrow in the FIG. 2 graph.

In addition the graph shown in FIG. 2 shows a tolerance range 3 defined by a reference amplitude R and a tolerance value $\alpha$. The tolerance range 3 extends from a lower limit of the vibration amplitude $R-\alpha$ to an upper limit of the vibration amplitude $R+\alpha$. The underlying method according to the invention provides that contact between counterpart tool and sonotrode is determined when the vibration amplitude leaves the tolerance range 3 within the measurement time interval $\Delta T$, here therefore after the delay time $t_d$, and thus assumes values greater than $R+\alpha$ or smaller than $R-\alpha$.

It will be seen that at the location identified by reference 2 in the time configuration 1 of the vibration amplitude $A_0$ the vibration amplitude $A_0$, within the measurement time interval $\Delta T$ which began after the delay time $t_d$, assumes a value outside the tolerance range 3 after it had previously still assumed a value within the tolerance range 3. The associated time $t_0$ is consequently determined by the moment in time at which the vibration amplitude $A_0$ lies for the first time outside the tolerance range 3. The time $t_0$ is now determined as the moment in time at which contact has occurred between sonotrode and counterpart tool.

In the embodiment of the invention which forms the basis of the graph shown in FIG. 2 the ultrasonic vibration apparatus is shut down after a follow-on time $t_N$ as a reaction to the given contact occurring between counterpart tool and sonotrode, so that the vibration of the sonotrode ends. The follow-on time $t_N$ is also shown by a double-headed arrow in FIG. 2, starting from the time $t_0$ at which the sonotrode and counterpart tool come into contact. In that respect the method forming the basis for the illustrated configuration 1 of the vibration amplitude $A_0$ provides that the vibration amplitude is steadily decreased within the follow-on time $t_N$.

With the expiry of the follow-on time $t_N$ the vibration of the sonotrode ends within a very short period, within which the vibration amplitude falls to the zero position of the vibration amplitude.

To sum up: the present invention concerns a method of detecting the making or breaking of contact of a sonotrode (4) which is caused to vibrate with a frequency f and a vibration amplitude $A_0$ with a counterpart element (5). To provide a method with which contact-making or breaking of a sonotrode with a counterpart element can be particularly quickly and inexpensively detected it is proposed according to the invention that the method has the following steps: a) recording a time configuration of the vibration amplitude $A_0$ (1) during a first measurement time interval $\Delta T$, and b) determining from the time configuration of the vibration amplitude $A_0$ (1) whether making or breaking of contact occurred within the measurement time interval $\Delta T$.

LIST OF REFERENCES 1 time configuration of the vibration amplitude
2 location in the value range of the vibration amplitude
3 tolerance range
4 sonotrode
5 counterpart tool
6 raised portion
7 material
R reference amplitude
$\alpha$ tolerance value
$t_d$ delay time
$t_N$ follow-on time
$t_0$ moment in time
t time
$A_0$ vibration amplitude (amplitude of the vibration of the sonotrode)

The invention claimed is:

1. A method for controlling an ultrasonic oscillating device which has a sonotrode (4) and a counterpart tool (5) and wherein the counterpart tool (5) is arranged opposite the sonotrode (4) during operation in such a way that a material (7) is arranged between the sonotrode (4) and the counterpart tool (5) for processing by the sonotrode (4), the method comprising:
  A) exciting the sonotrode (4) with an oscillation for a predetermined period of time td and processing the material, the predetermined period of time td being followed by:
  B) carrying out a method for detecting an in-or out-of-contact occurrence of the sonotrode (4), which is set into an oscillation with a frequency f and an oscillation amplitude $A_0$, with the counterpart tool (5);
  the method for detecting comprising:
    a) detecting a time curve of the oscillation amplitude $A_0(1)$ during a first measurement period $\Delta T$,
    b) determining from the time curve of the oscillation amplitude $A_0(1)$ whether an in-contact or out-of-contact occurrence has taken place within the measurement period $\Delta T$, and
  C) ending the excitation of the sonotrode (4) or moving the sonotrode (4) away from the counterpart tool (5) if an in-contact occurrence between the sonotrode (4) and counterpart tool (5) was detected in step B).

2. A method according to claim 1 characterised in that in step b) the in-contact or out-of-contact occurrence of the sonotrode (4) with the counterpart tool (5) is determined if the oscillation amplitude $A_0$ differs from a predetermined reference amplitude R by more than a predetermined tolerance value α or if the oscillation amplitude $A_0$ lies outside a predetermined tolerance interval $[T_{min}, T_{max}]$.

3. A method according to claim 2 characterised in that before step a) during a second measurement time interval Δt a time course of the oscillation amplitude $A_0$ is recorded and the reference amplitude and/or the tolerance interval are calculated from the recording during the second measurement time interval Δt.

4. A method according to claim 3 characterised in that
   i) a mean oscillation amplitude is calculated from the recording during the second measurement time interval Δt and the calculated mean oscillation amplitude is used in step b) as the predetermined reference amplitude, and/or
   ii) a minimum oscillation amplitude $A_{min}$ and a maximum oscillation amplitude $A_{max}$ is determined from the recording during the second measurement time interval Δt and the tolerance interval is calculated from the minimum oscillation amplitude $A_{min}$ and the maximum oscillation amplitude $A_{max}$ with $T_{min} \leq A_{min}$ and $T_{max} \geq A_{max}$.

5. A method according to claim 2 characterised in that the method has the following further step:
   c) determining a time $t_0$ at which the in-contact or out-of-contact occurrence determined in step b) occurs, from a time course of the oscillation amplitude (1), wherein the time at which the oscillation amplitude within the measurement time interval ΔT for the first time leaves a tolerance range $[T_{min}, T_{max}]$ or $[R-\alpha, R+\alpha]$ (3) or a time shifted from said first time by a predefined correction time is established as the time to of the in-contact or out-of-contact occurrence.

6. A method according to claim 1 characterised in that in step a) the sonotrode (4) is excited by a converter, wherein the converter is connected to a current generator and a current $I_E(t)$ which is provided by the current generator and flows through the converter is measured, in which case a voltage $U_E(t)$ applied to the converter by the current generator is measured, and wherein the oscillation amplitude or a field size related to the oscillation amplitude of an electrical vibration system comprising the current generator and the converter is calculated from the measured voltage $U_E(t)$ and from the measured current $I_E(t)$.

7. A method according to claim 1 characterised in that in step a) a sampling rate for determining a time course of the oscillation amplitude of at least 2000 samples/s is used.

8. A method according to claim 7 characterised in that in step a) a sampling rate for determining the time course of the oscillation amplitude of at least 5000 samples/s is used.

9. A method according to claim 8 characterised in that in step a) a sampling rate for determining the time course of the oscillation amplitude of at least 15000 samples/s is used.

10. A method according to claim 1 characterised in that a counterpart tool (5) is used as the counterpart tool, wherein a material (7) is between the sonotrode (4) and the counterpart tool (5) and wherein the in-contact or out-of-contact occurrence of the sonotrode (4) with the counterpart tool (5) is detected.

11. A method according to claim 1 characterised in that step C) is carried out only after the expiry of a predefined follow-on time ty after detection of the in-contact or out-of-contact occurrence.

12. A method according to claim 11 wherein immediately after detection of the in-contact or out-of-contact occurrence a reduction in the oscillation amplitude is implemented.

13. A method according to claim 1, wherein the material is processed during step b).

* * * * *

UNITED STATES PATENT AND TRADEMARK OFFICE
CERTIFICATE OF CORRECTION

| | | |
|---|---|---|
| PATENT NO. | : 12,222,698 B2 | Page 1 of 1 |
| APPLICATION NO. | : 17/417913 | |
| DATED | : February 11, 2025 | |
| INVENTOR(S) | : Gerhard Gnad | |

It is certified that error appears in the above-identified patent and that said Letters Patent is hereby corrected as shown below:

In the Specification

Column 2, Line 60, change "tin" to -- t in --

In the Claims

Column 11, Line 31, change "time to" to -- time $t_0$ --

Column 12, Line 27, change "ty" to -- $t_N$ --

Signed and Sealed this
Eighth Day of April, 2025

Coke Morgan Stewart
*Acting Director of the United States Patent and Trademark Office*